US010196890B2

(12) United States Patent
Finfer et al.

(10) Patent No.: US 10,196,890 B2
(45) Date of Patent: *Feb. 5, 2019

(54) METHOD OF ACOUSTIC SURVEYING

(71) Applicant: Silixa Ltd., Elstree, Hertforshire (GB)

(72) Inventors: Daniel Finfer, Hertfordshire (GB);
Kjetil Johannessen, Trondheim (NO)

(73) Assignee: Silixa Ltd., Elstree, Hertfordshire (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/830,807

(22) Filed: Dec. 4, 2017

(65) Prior Publication Data
US 2018/0087370 A1    Mar. 29, 2018

Related U.S. Application Data

(63) Continuation of application No. 14/232,117, filed as application No. PCT/GB2012/051682 on Jul. 13, 2012, now Pat. No. 9,850,749.

(30) Foreign Application Priority Data

Jul. 13, 2011   (GB) .................................. 1111980.7

(51) Int. Cl.
E21B 47/00     (2012.01)
E21B 47/10     (2012.01)
E21B 47/12     (2012.01)
G01V 1/22      (2006.01)
G01H 9/00      (2006.01)

(52) U.S. Cl.
CPC ............ *E21B 47/00* (2013.01); *E21B 47/101* (2013.01); *E21B 47/123* (2013.01); *G01H 9/004* (2013.01); *G01V 1/226* (2013.01)

(58) Field of Classification Search
CPC ................... E21B 47/00; E21B 47/10; E21B 47/101–47/102; E21B 47/12;
(Continued)

(56) References Cited

U.S. PATENT DOCUMENTS 5,946,429 A   8/1999  Huang et al.
6,026,913 A   2/2000  Mandal et al.
(Continued)

FOREIGN PATENT DOCUMENTS

WO   2009/067041 A1   5/2009
WO   2010/136809 A2   12/2010
WO   2010/136810 A2   12/2010

OTHER PUBLICATIONS

International Search Report for corresponding International Application No. PCT/GB2012/051682, dated Feb. 22, 2013 (3 pages).
(Continued)

*Primary Examiner* — Toan Le
(74) *Attorney, Agent, or Firm* — Osha Liang LLP

(57) ABSTRACT

The invention relates to the use of distributed optical fibre sensors for distributed acoustic sensing, and in particular, modal analysis of distributed acoustic data obtained in-well to monitoring well integrity. By determining one or more acoustic modes corresponding to distributed speed of sound measurements within the wellbore, and analysing variations in the distributed speed of sound measurement it is possible to derive information relating to a formation and/or fluid in the wellbore.

18 Claims, 7 Drawing Sheets

(58) Field of Classification Search
CPC ......... E21B 47/123; E21B 49/00; G01H 9/00; G01H 9/002; G01H 9/004; G01H 9/008; G01V 1/00; G01V 1/226; G01V 1/40; G01V 1/44; G01V 1/46; G01V 1/48; G01V 1/50

See application file for complete search history.

(56) References Cited

U.S. PATENT DOCUMENTS

| | | | |
|---|---|---|---|
| 6,874,361 | B1 | 4/2005 | Meltz et al. |
| 9,850,749 | B2 * | 12/2017 | Finfer .................... E21B 47/00 |
| 2005/0000289 | A1 | 1/2005 | Gysling et al. |
| 2008/0078247 | A1 | 4/2008 | Hunaidi et al. |
| 2010/0107754 | A1 | 5/2010 | Hartog et al. |
| 2010/0200743 | A1 | 8/2010 | Forster et al. |

OTHER PUBLICATIONS

Written Opinion for corresponding International Application No. PCT/GB2012/051682, dated Feb. 22, 2013 (3 pages).

Lea and Kyllingstad, "Propagation of Coupled Pressure Waves in Borehole with Drillstring", International Conference on Horizontal Well Technology, SPE37156 pp. 963-970, 1996 (10 pages).

Rao and Vandiver, "Acoustics of fluid-filled boreholes with pipe: Guided propagation and radiation", J. Acoust. Soc. Am. 105(6), pp. 3057-3066, 1999 (11 pages).

Zhiqiang Zhao et al., "Improved Demodulation Scheme for Fiber Optic Interferometers Using an Asymmetric 3×3 Coupler", J. Lightwave Technology, vol. 13, No. 11, Nov. 1997, pp. 2059-2068 (10 pages).

Sandoy, B. et al., "Improved Reservoir Management with Intelligent Multizone Water-Alternating-Gas (WAG) Injectors and Downhole Optical Flow Monitoring", May 2007, SPE Productions and Operations, pp. 176-189 (18 pages).

Hull, J.W. et al., "Well Integrity Monitoring & Analysis Using Distributed Fiber Optic Acoustic Sensors", 2010 IADC/SPE Drilling Conference and Exhibition, Feb. 2-4, 2010, New Orleans, Louisana (7 pages).

Office Action issued in corresponding UK Application No. GB1720741.6 dated Jan. 19, 2018, (4 pages).

* cited by examiner

METHOD OF ACOUSTIC SURVEYING

The present invention relates to distributed optical fibre sensors for distributed acoustic sensing, methods of use in acoustic surveying and applications thereof. In particular, modal analysis of distributed acoustic data obtained in-well provides a means for monitoring well integrity.

BACKGROUND TO THE INVENTION

Flow metering is a key measurement when attempting to optimise production from a well. However, current technologies are limited to flow measurements at a limited number of discrete locations, for example by permanent installation of optical flow meters at a number of spaced locations along a length of production tubing.

Well integrity is also a key concern. However, using such a flow metering system again only allows measurements to be made at discrete points—although by measuring the speed of sound in the tubing the contents of the tubing can be determined, albeit only at those discrete points.

Noise logging can also be employed to determine in-well fluid flow and composition. Again, such measurements can only be made at discrete points, unless they are made while lowering a hydrophone into the well. Such a measurement requires an intervention, and so is generally undesirable.

Downhole optical fibres are used in a number of different applications as a replacement for conventional technologies that cannot withstand the pressures and temperatures that fibre based sensors can withstand. Furthermore, distributed optical fibre sensors may allow simultaneous measurements at a significantly greater number of measurement points— not limited by individual physical sensors.

It is proposed by the Applicant to employ optical fibre based sensors, such as their proprietary Intelligent Distributed Acoustic Sensor (iDAS), for the purposes of wellbore surveying and in particular downhole flow metering to obtain a distributed measurement of in-well fluid flow. However, it is not obvious how the skilled person could employ the iDAS technology to produce meaningful survey data or useful distributed flow data.

It is anticipated that the solution will be applicable to many different applications and to data obtained from a variety of different measurements (i.e. not just iDAS).

It is therefore an object of at least one embodiment of the present invention to provide a method of surveying a wellbore based on obtaining a distributed acoustic measurement of the wellbore.

It is also an object of at least one embodiment of the present invention to provide corresponding methods of monitoring a formation and of monitoring fluid flow within a wellbore.

SUMMARY OF THE INVENTION

According to a first aspect of the invention, there is provided a method of surveying a wellbore comprising: obtaining a distributed acoustic measurement within and corresponding to at least a portion of the wellbore; processing the distributed acoustic signal to obtain a distributed speed of sound measurement within the wellbore; and analysing variations in the distributed speed of sound measurement to derive information relating to a formation and/or fluid in the wellbore; the method further comprising determining an acoustic mode corresponding to the, each, or a distributed speed of sound measurement within the wellbore.

A measured acoustic signal is likely to comprise contributions from several spatially simultaneous acoustic modes within the wellbore, each having a corresponding speed of sound. The present invention makes use of a distributed speed of sound measurement (i.e. speed of sound determined as a function of position) and, by looking at absolute values of and changes in the speeds of sound as measured, derive information about a formation and/or fluid within the wellbore.

Preferably, the analysis comprises analysing variations in the distributed speed of sound measurement as a function of position. Additionally, or alternatively, the analysis comprises analysing variations in the distributed speed of sound measurement as a function of time.

Analysing variations as a function of position allows, for example, the location of defects or changes to be determined. Analysing variations as a function of time allows, for example, real time monitoring of the occurrence and developments of defects or changes. A combination of both position- and time-based analysis provides a means to monitor where and when defects or developments occur, and track them.

Preferably, processing the distributed acoustic signal comprises determining a plurality of distributed speed of sound measurements within the wellbore as a function of position.

By way of example, an installation comprising a cased wellbore and a recovery pipeline disposed therethrough will result in the presence of at least three acoustic modes (as described in the following description of the figures). Determining speed of sound for a particular acoustic mode (whose position is known) provides a mechanism for tracking the behaviour of that acoustic mode by virtue of the distributed nature of the speed of sound measurement.

It is therefore preferable that processing the distributed acoustic signal comprises obtaining a plurality of distributed speed of sound measurements.

Preferably, the analysis comprises determining an acoustic amplitude corresponding to the, each or a distributed speed of sound measurement. Alternatively, or additionally, the analysis comprises determining relative amplitudes corresponding to different acoustic modes. Alternatively, or additionally, the analysis comprises determining dispersion characteristics of the, each, or an acoustic mode. Alternatively, or additionally, the analysis comprises determining an upper-frequency cut-off for the presence of modal phenomena.

Most preferably, the analysis comprises inverting a wellbore model against the distributed speed of sound measurement in order to determine a value of one or more unknown parameters in the wellbore model. Optionally, the wellbore model is configured to receive as an input one or more speed of sound measurements and output one or more corresponding wellbore parameters.

As described in more detail below, acoustic propagation within a wellbore can be modelled using (for example) full 3-D elastodynamic equations and parameters of the well. Such parameters might include the hardness of the formation. Such a wellbore model can therefore be modified to treat speed of sound as a known parameter and other model parameters as unknowns.

Preferably, the analysis comprises identifying one or more features in the, each or a distributed speed of sound measurement and attributing the one or more features to one or more corresponding events.

Features in, say, a trace of speed of sound versus position for a particular acoustic mode may reveal the presence (and, of course, location) of a gas bubble or a hydrate clump, a change in pipe diameter, a leak in the casing or some undesirable downhole activity. These features may be identified by manual inspection, neural network processing, pattern recognition or, in light of the teachings of the present application, one of a variety of suitable feature identification methods that will be apparent to the skilled person. In addition, if multiple acoustic modes are present, identification of which modes exhibit the features, relative strengths therebetween, etc. all provide diagnostic information regarding the wellbore and/or the formation.

Optionally, identifying one or more features comprises determining the presence and/or location of one or more discontinuities; variations; and/or relative variations between modes, in relation to speed of sound and/or amplitude corresponding to an acoustic signal.

Optionally, the analysis comprises averaging the, each, or a distributed speed of sound measurement along at least a portion of the wellbore.

This provides an indication of peak quality and, in the presence of multiple acoustic modes, a comparative measure of signal strengths and profiles.

According to a second aspect of the invention, there is provided a method of monitoring a formation, comprising the method of the first aspect.

Preferably, the method comprises identifying the or each distributed speed of sound measurement that corresponds to an acoustic mode which penetrates the formation.

Optionally, the method comprises determining hardness of the formation. The method may be affected by the development of a Mach Cone resulting from a higher speed of propagation within the steel than can be sustained by the formation.

Embodiments of the second aspect of the invention may include one or more features corresponding to features of the first aspect of the invention or its embodiments, or vice versa.

According to a third aspect of the invention, there is provided a method of monitoring fluid flow within a wellbore, comprising the method of the first aspect.

Optionally, the method comprises tracking eddies, detecting outgassing events, and/or detecting the presence and position of solids or particulate material in the wellbore.

Embodiments of the third aspect of the invention may include one or more features corresponding to features of the first or second aspects of the invention or their embodiments, or vice versa.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

Figure 1:
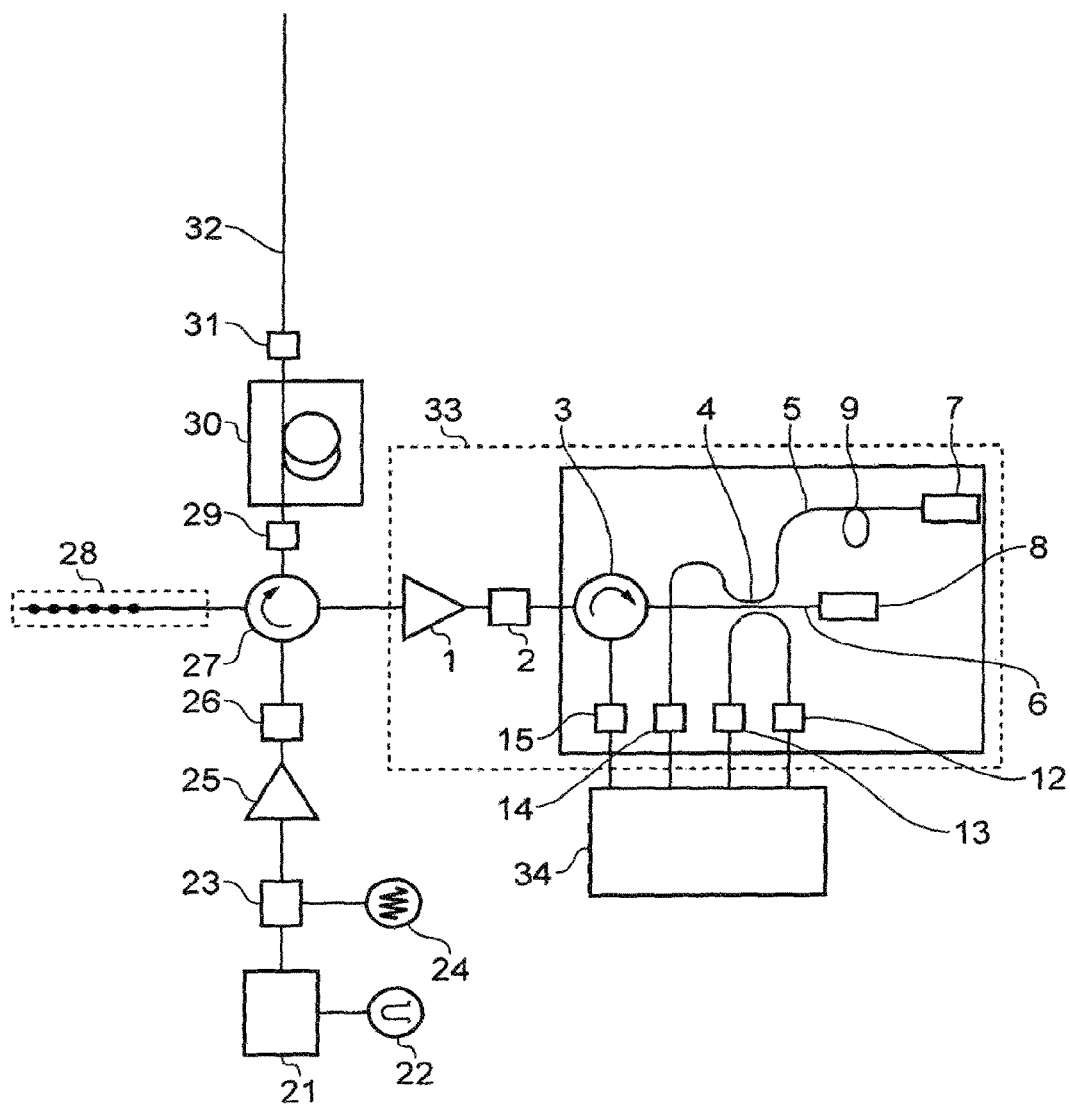
FIG. 1 illustrates in schematic form a distributed fibre optic system for measuring the optical amplitude, phase and frequency of an optical signal from which the acoustic amplitude, phase and frequency may be derived, and which may be comprised in a detection means or distributed acoustic sensor in accordance with an embodiment of the present invention.

In a particular embodiment of the invention, described here in order to provide an example of a preferred implementation of the present invention, a plurality of acoustic sensors is provided in a distributed optical fibre sensor which comprises a length of optical fibre—located in a location or environment to be monitored as illustrated in FIG. 1. Examples of such distributed sensor arrangements are described in Silixa Limited's international patent application publication numbers WO2010/136809A2 and WO2010/136810A2 and in further detail below. Using such interferometers as an optical sensor, it is possible to make measurements of acoustic phase, frequency and amplitude from an optical sensor with high sensitivity, high speed of measurement and a large dynamic range.

With reference to FIG. 1, light emitted by a laser (21) is modulated by a pulse signal (22). An optical amplifier (25) is used to boost the pulsed laser light, and this is followed by a band-pass filter (26) to filter out the Amplified Spontaneous Emission noise (ASE) of the amplifier. The optical signal is then sent to an optical circulator (27). An additional optical filter (28) may be used at one port of the circulator (27). The light is sent to sensing fibre (32), which is for example a single mode fibre or a multimode fibre. A length of the fibre may be isolated and used as a reference section (30), for example in a "quiet" location or with a controlled reference signal. The reference section (30) may be formed between reflectors or a combination of beam splitters and reflectors (29) and (31). The reflected and the backscattered light generated along the sensing fibre (32) is directed through the circulator (27) and into the interferometer (33).

Within the interferometer, the incoming light is amplified in an optical amplifier (1), and transmitted to the optical filter (2). The filter (2) filters the out of band ASE noise of the amplifier (1). The light then enters into an optical circulator (3) which is connected to a 3×3 optical coupler (4). A portion of the light is directed to the photodetector (12) to monitor the light intensity of the input light. The other portions of light are directed along first and second optical paths (5) and (6), with a path length difference between the two paths. Faraday-rotator mirrors (FRMs) (7) and (8) reflect the light back through the first and second paths (5) and (6), respectively. The Faraday rotator mirrors provide self-polarisation compensation along optical paths (5) and (6) such that the two portions of light efficiently interfere at each of the 3×3 coupler (4) ports. The optical coupler (4) introduces relative phase shifts of 0 degrees, +120 degrees and −120 degrees to the interference signal, such that first, second and third interference signal components are produced, each at a different relative phase.

First and second interference signal components are directed by the optical coupler (4) to photodetectors (13) and (14), and the third interference signal component incident on the optical circulator (3) is directed towards photodetector (15).

The photodetectors (12), (13), (14) and (15) convert the light into electrical signals. The electrical signals are digitised and then the relative optical phase modulation along the reference fibre (30) and the sensing fibre (32) is computed using a fast processor unit (34). The processor unit is time synchronised with the pulse signal (22). The path length difference between path (5) and path (6) defines the spatial resolution, and the origin of the backscattered light (i.e. the position of the measured condition) is derived from the timing of the measurement signal. Rapid measurement is made possible by measuring light intensity only.

Methods for calculating the relative phase and amplitude from three phase shifted components of an interference signal are known from the literature. For example, Zhiqiang Zhao et al. ("Improved Demodulation Scheme for Fiber Optic Interferometers Using an Asymmetric 3×3 Coupler", J. Lightwave Technology, Vol. 13, No. 11, November 1997, pp. 2059-2068) and Huang et al (U.S. Pat. No. 5,946,429) describe techniques for demodulating the outputs of 3×3 couplers in continuous wave multiplexing applications.

The phase angle data (or relative phase) is sensitive to acoustic perturbations experienced by the sensing fibre. As an acoustic wave passes through the optical fibre, it causes the glass structure to contract and expand. This varies the optical path length between the backscattered light reflected from two locations in the fibre (i.e. the light propagating down the two paths in the interferometer), which is measured in the interferometer as a relative phase change. In this way, the optical phase angle data can be processed to measure the acoustic signal at the point at which the light is reflected or backscattered. The result is that the true acoustic field can be measured at any and/or all points along the fibre.

It is a key benefit of this "iDAS" system that, in comparison to previous technologies which consist of distributed point sensors or require special components such as fibre gratings, it is possible to obtain a continuum of acoustic signal measurements along a length of optical fibre. However, in practical terms, measurements will typically be performed at a spacing (i.e. resolution) of 1 meter over several thousand meters of optical fibre. A key application is in the monitoring of in-well (and out-of-well) acoustic signals, where an optical fibre is deployed within a well and iDAS employed to measure, in real-time, sound as a function of depth. Note that fibres can be deployed retrospectively for this purpose, although it is common for fibre optic cables to have already be deployed in permanent installations which iDAS can simply be coupled to.

From iDAS measurements taken over a period of time, it is possible to derive a measure of the speed of sound corresponding to a particular acoustic signal at a particular position along the fibre (and hence at a particular depth in a well).

It will of course be understood that the concepts and applications presented in the following description in the context of upstream measurements (e.g. within production and injection wells), will apply equally to midstream (e.g. within flowlines and pipelines) and downstream (e.g. within refineries and petrochemical plants) measurements, as well as a host of other applications, in the energy field and other fields, that will be readily apparent to the skilled reader. Furthermore, while iDAS is the preferred measurement system for obtaining acoustic measurements, it will be understood that the concepts will apply equally to other distributed acoustic measurement systems.

Figure 2:
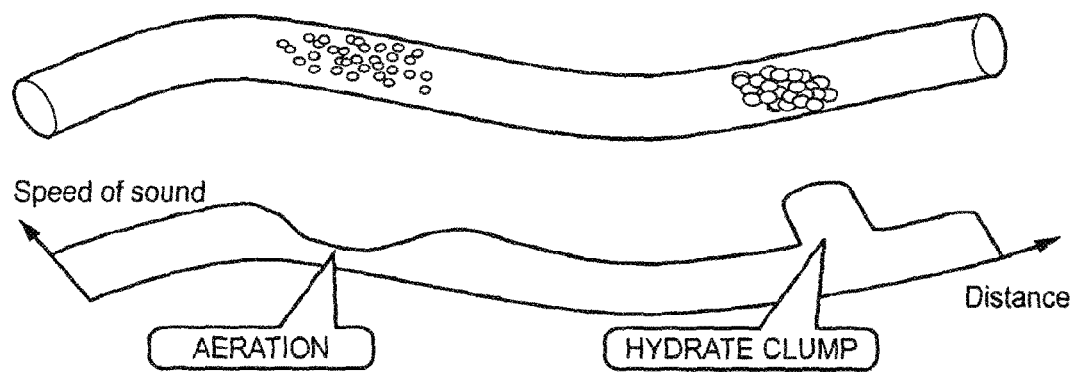
FIG. 2 illustrates in schematic form how the speed of sound within a tubular, such as a downhole section of pipe, varies dependent on the composition of the fluid within, providing a basis for distributed flow monitoring.

As described briefly above, FIG. 2 illustrates how the speed of sound within a tubular is affected by the composition of the fluid within the tubular. It is evident from the trace below the tubular that the presence of a gas (e.g. In air bubbles as illustrated or in the event of outgassing) will result in a localised reduction in the speed of sound, and that in contrast the presence of a dense or particulate material (e.g. a hydrate clump) will result in a localised increase in the speed of sound. Importantly, it should be realised that conventional acoustic detection techniques, such as the use of hydrophones or fibre gratings, may be useful for implementing this technology but may not provide sufficient spatial resolution or be adequately positioned to identify highly localised occurrences such as these that might relate to unfavourable (or perhaps favourable) developments within the well. On this basis, iDAS provides a sensitive means of performing distributed flow monitoring including fluid composition monitoring such as determining liquid to gas ratio (as described in Silixa Limited's international patent application publication numbers WO2010/136809A2 and WO2010/136810A2).

Figure 3:
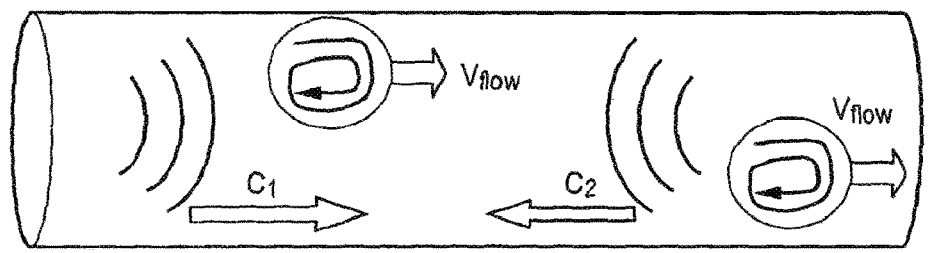
FIG. 3 illustrates in schematic form how the speed of sound within a tubular, such as a downhole section of pipe, varies dependent on the speed and direction of fluid flow within the tubular, providing a further or alternative basis for distributed flow monitoring and eddy tracking.

FIG. 3 illustrates how the speed of sound within a tubular is also affected by the direction of propagation of the sound wave or, to put it another way, the relative direction of the fluid flow within the tubular. Also illustrated, schematically, are eddies which in addition to contributing to localised variations in the speed of sound will generally move in the direction of fluid flow. Using iDAS, these eddies can be tracked in real-time. Accordingly, further or alternative bases for distributed flow monitoring are provided.

Figure 4:
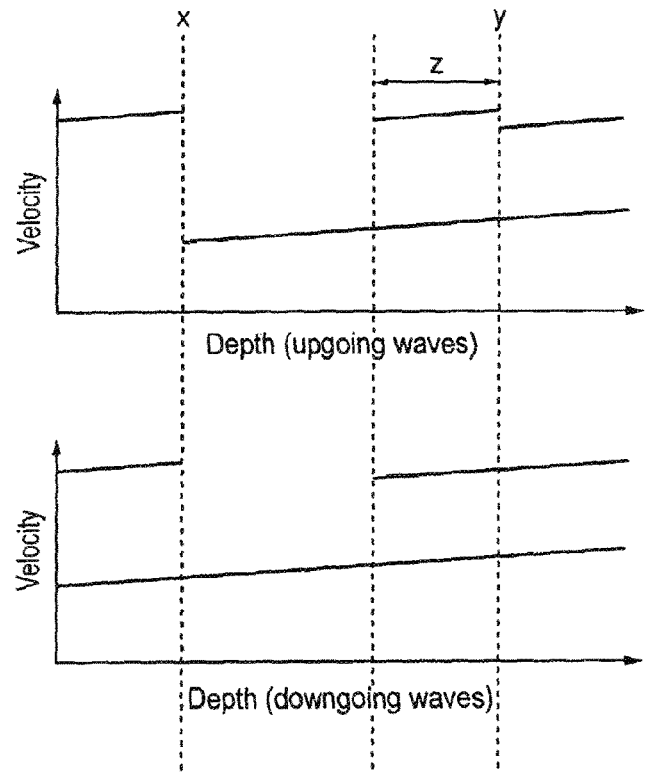
FIG. 4 illustrates, as a function of depth, the speed of sound waves travelling within a well in (top) an upwards direction and (bottom) a downwards direction, from which information about the well can be determined.

FIG. 4 shows as schematic data to enhance features (top) the speed of upward-travelling sound waves within a well as a function of depth and (bottom) the speed of downward-travelling soundwaves within a well as a function of depth. For actual calculations a colour map provides additional information of intensity (i.e. amplitude), with red indicating strongest signal power and blue indicating weakest signal power. From these graphs, it is possible to determine characteristics and/or diagnostic information about the well. These characteristics have been determined for actual wells with greater detail than shown here.

For example, it can be observed from FIG. 4 that (aside from the discontinuities) the sound speed varies generally linearly with depth, which is consistent with the expected variations in speed of sound in deep waters. In the deep isothermal layer, temperature and salinity are substantially uniform and as such the speed of sound varies only with pressure.

However, as noted above there are several discontinuities in the plots. In the upward-travelling sound waves plot there is a discontinuity at position X above which the velocity is ~1500 m·s$^{-1}$ and below which the velocity is ~1300 m·s$^{-1}$.

Furthermore, there is a significant discontinuity at position Y. This discontinuity has been found to correspond to a change in casing cross-section.

The discontinuity corresponds to a change between a larger (7") diameter inner pipe and a smaller (5.5") diameter pipe. Accordingly, the speed of sound measurement provides a mechanism for measuring said pipe diameter, or at least for detecting changes in pipe diameter.

Figure 5:
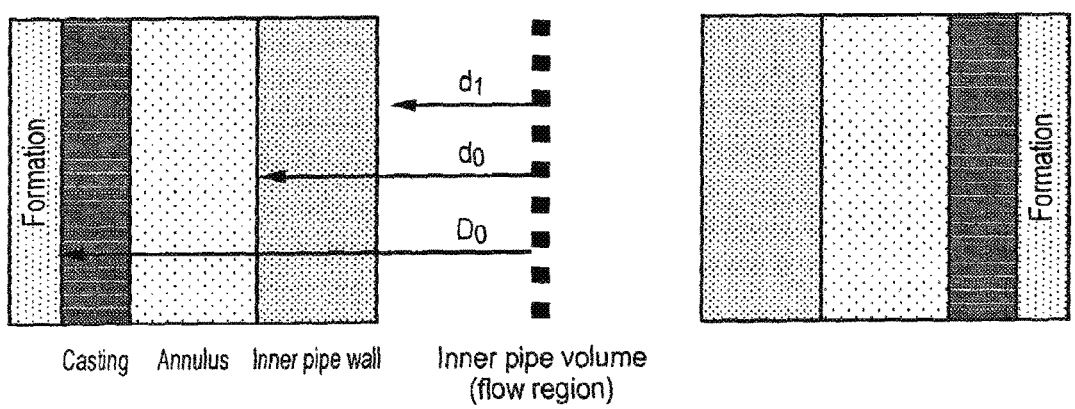
FIG. 5 illustrates in schematic form a cross section through a pipe and casing-lined well, corresponding to the well to which FIG. 4 relates.

It is noted that in some regions, multiple coincident sound speeds are visible. Lea and Kyllingstad ("Propagation of Coupled Pressure Waves in Borehole with Drillstring", International Conference on Horizontal Well Technology, SPE37156 pp. 963-970, 1996) describe the physics of a coupled system in which waves within the drill string communicate within the annulus as a result of the annular flexibility of the drill string and of the formation. In cross-section, this is analogous to the pipe within a cased borehole (as illustrated in cross-section in FIG. 5). Accordingly, it is possible to derive the equations of motion for the inner fluid volume (i.e. the fluid within the pipe), the pipe itself, and the outer fluid volume (i.e. the fluid in the annulus between the pipe and the casing).

The skilled person will readily appreciate that equivalent equations of motion may be derived for any multi degree of freedom oscillating system and therefore that the invention is applicable to systems other than systems comprised of a pipe within cased borehole. However the invention will be further described in the context of such a system in order to provide an illustrative example with real data obtained through experiment.

In this example, analysis has shown that the fluid pressure communication between the inner fluid volume, the pipe, and the outer fluid volume leads to the presence of a coupled mode system containing three modes, each of which consists of three waves. The first wave is predominantly within the inner fluid volume, the second wave is predominantly within the walls of the pipe, and the third wave is predominantly in the outer fluid volume. Based on the well geometries in the vicinity of the change in cross-section at position Y the mode shapes and velocities can be determined and are illustrated in FIG. 6.

Figure 6:
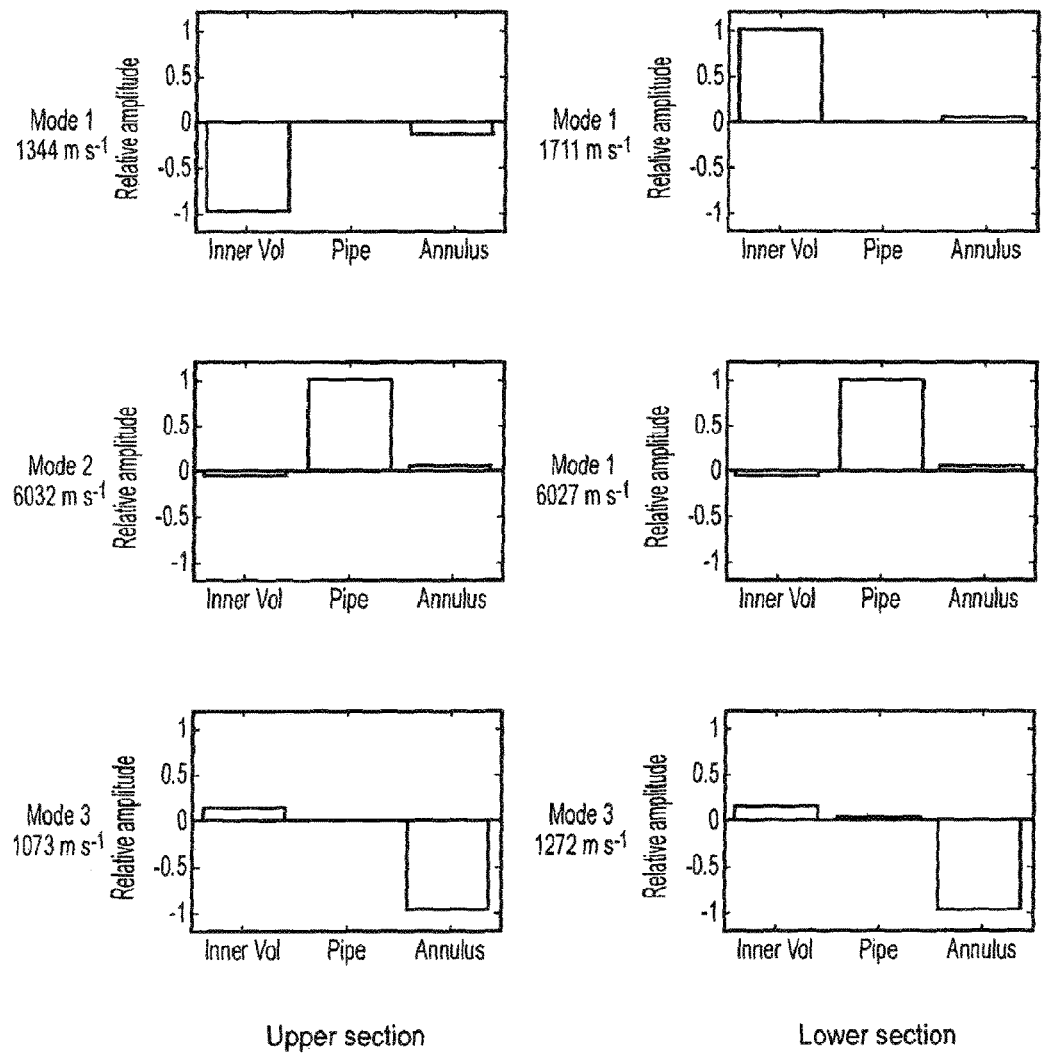
FIG. 6 illustrates the mode shapes for the well to which FIG. 4 relates, in the vicinity of a change in pipe cross-section

FIG. 6 demonstrates the presence of said three mode shapes each consisting of three different waves. The first (Mode 1—top) consists of a pressure wave with a dominant presence in the inner fluid volume. The second (Mode 2—middle) consists of a strain wave in the wall of the pipe itself. The third (Mode 3—bottom) consists of another pressure wave with a dominant presence in the annular fluid volume.

Based on this information, it is possible to determine the root of the coincident sound speeds evident in FIG. 4. In region Z, the slower-propagating wave is a pressure wave predominantly in the annular fluid volume and the faster-propagating wave is a pressure wave predominantly in the inner fluid volume.

Note that employing the full 3-D elastodynamic solution for the geometry of a pipe within a borehole taught by Rao and Vandiver ("Acoustics of fluid-filled boreholes with pipe: Guided propagation and radiation", J. Acoust. Soc. Am. 105(6), pp 3057-3066, 1999) provides more complete information relating to the system, such as the amplitude of the signal in the three regions (inner fluid volume, pipe, and annular fluid volume), the relative amplitudes of signals in different modes, dispersion characteristics and the upper frequency cut-off for the modal phenomena.

The modal phenomena will occur when the wavelength of the acoustic signal is very long in comparison to the diameter of the borehole. At higher frequencies the speed of the wave will be the same as the thermodynamic speed of propagation for the unbounded fluid—which accounts for the presence of a wave moving at the speed of propagation of sound in water (~1500 m·s$^{-1}$).

The sound-speed effects, i.e. coupled modes, observed in the distributed acoustic measurements described above have, until now, never been observed or investigated in relation to cased production or injection tubes. In observing and analysing these phenomena, the work performed by the Applicant has resulted in a technique whereby modal analysis can be used to determine information concerning the formation or the fluid in the annulus, for example by inverting the model against the actual acoustic data. It also enables real-time monitoring of the formation, particularly where detailed information about the formation is already available, because it will be understood that acoustic energy from the modes propagating within the annulus will also penetrate into the formation.

By way of explanation, based on Rao & Vandiver's work, acoustic propagation and radiation in a particular well can be modelled using full 3-D elastodynamic equations and various parameters of the well itself including the hardness of the formation.

The Applicant has developed such a model of a pipe-in-pipe system, the accuracy of which has been confirmed against independent data on a well-known installation. Specifically, a measure of formation hardness has been obtained by modifying the Rao & Vandiver-based model to treat speed of sound as a known parameter and formation hardness as an unknown parameter. Accordingly, having established a model with known parameters it is in a similar way possible to determine other unknown parameters (or indeed look for discrepancies or changes in said known parameters) based on the measured speed(s) of sound.

Figure 10:
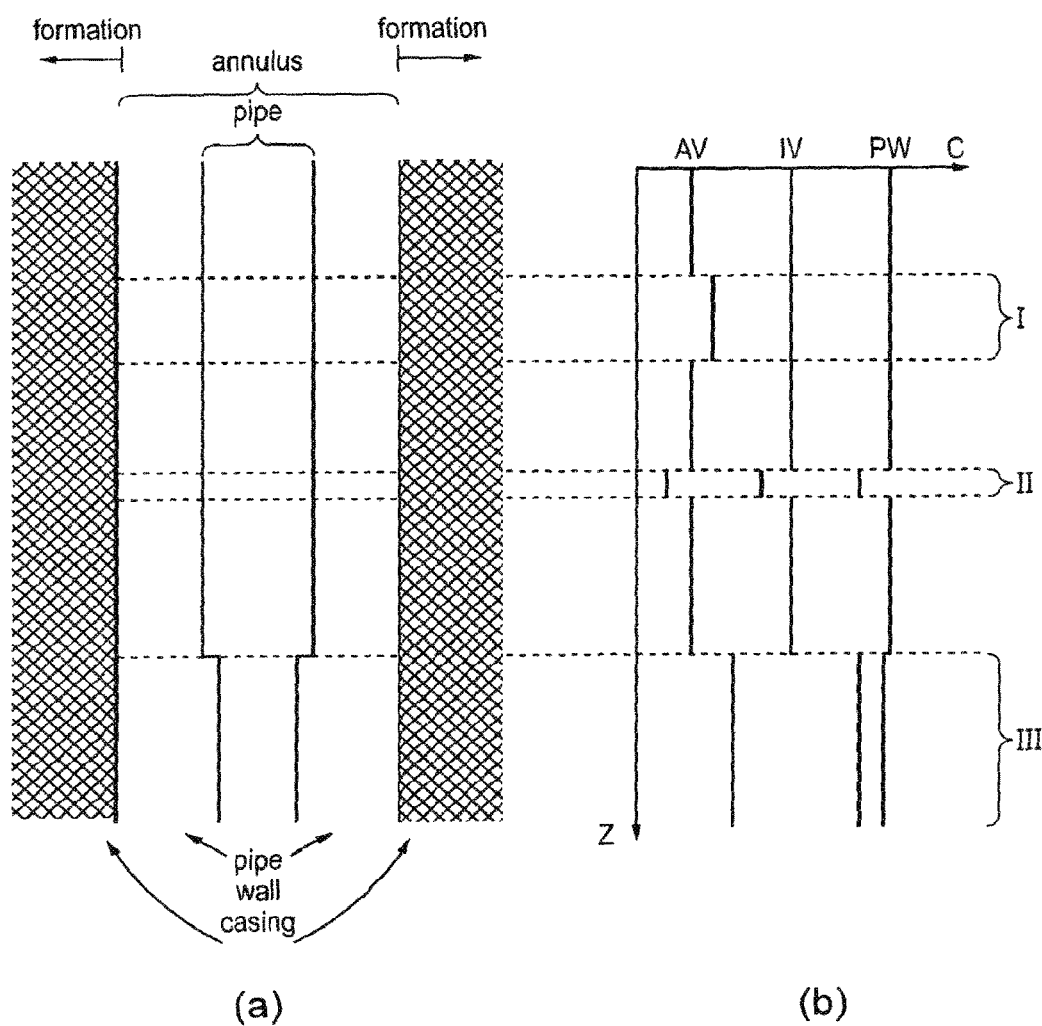
FIG. 10 illustrates in schematic form an example of the correlation between changes in acoustic mode data and changes in wellbore conditions.

To illustrate the above, FIG. 10 provides, in schematic form, (a) an example section of pipe within a wellbore with a number of features (or defects), alongside (b) a corresponding trace of speed of speed of sound versus distance. In this example, three acoustic modes are present, corresponding to a mode within the annular volume (AV), the inner volume (IV) and the pipe wall (PW). In region I, there is a discontinuity that affects substantially only the acoustic mode propagating in the annular volume. In this example this corresponds to a local increase in formation hardness. Similarly, there is a discontinuity in all three acoustic modes in region II, in this example corresponding to some damage to the wall of the pipe. Finally, in region III there is a narrowing of the inner pipe diameter which again affects the local speed of sound of all three modes. It will now be evident that while the model may be used to predict acoustic mode behaviour, the acoustic mode data can in fact be used to determine unknown parameters of the wellbore.

Note that the above example is described for the purposes of illustration only and the relative speeds and the nature and extent of the acoustic discontinuities are suggested and exaggerated to aid understanding of the invention.

Figure 7:
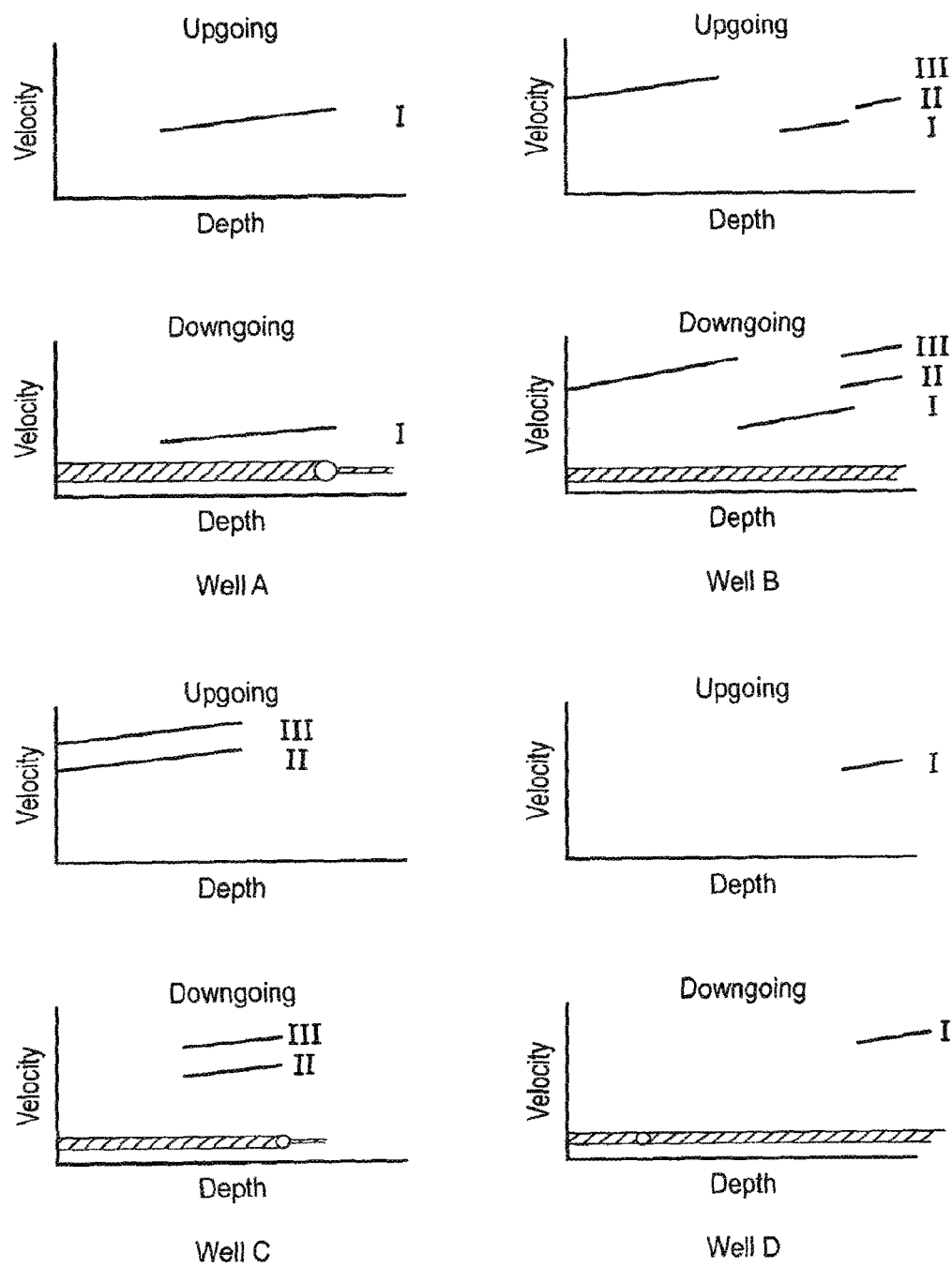
FIG. 7 illustrates the detected speeds of sound, as a function of depth, for four separate wells exhibiting different behaviour relating to different conditions and parameters in each well.

FIG. 7 shows schematically speed of sound as a function of depth (again in both directions supported by the waveguide) for four separate example wells, in a similar manner to the way in which corresponding data was presented in FIG. 4 (see above). In these graphs it will be noted (particularly in the cases of (b) Well B and (c) Well C) that there again exist spatially simultaneous different acoustic modes (propagating at different speeds), some of which are associated with discontinuities (e.g. see the top graph of (b) Well B). Note that the thick red lines indicate the pipe diameter as a function of depth and, importantly, changes in pipe diameter which can be seen to correspond with discontinuities and other phenomena in the measured speed of sound. White lines are used to denote the separate modes, which are also identified by labels.

Figure 8:
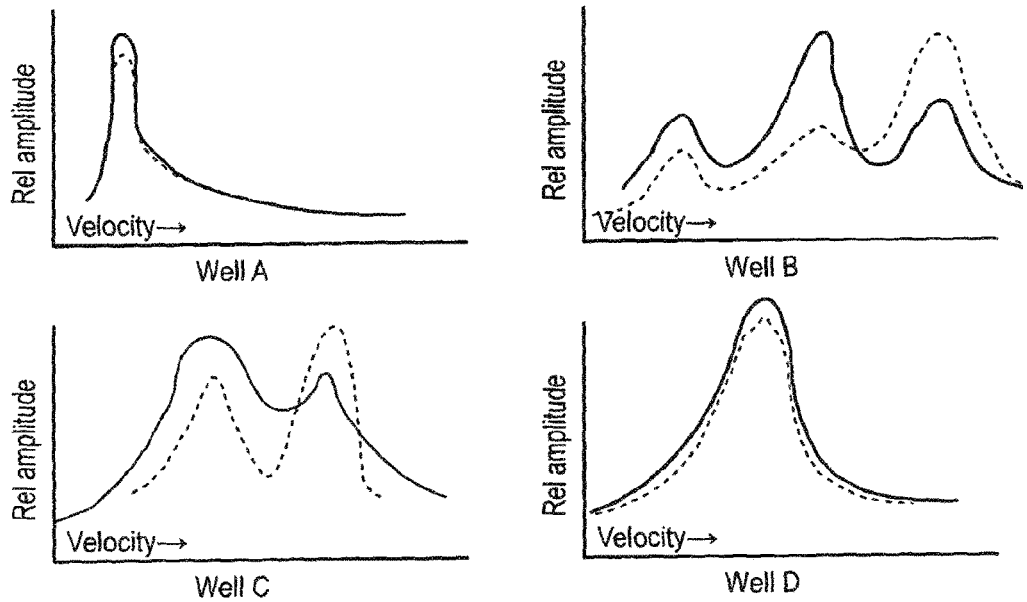
FIG. 8 illustrates the peak quality as a function of speed of sound, averaged along the entire depth of the wells to which FIG. 7 relates.

FIG. 8 shows the peak quality of the data presented in FIG. 7, in which the speed data has been averaged along the entire depth of each well and subsequently normalised. The presence of the distinct modes (in (b) Well B and (c) Well C), and the relative strengths and profiles therebetween, are evident from these plots.

Figure 9:
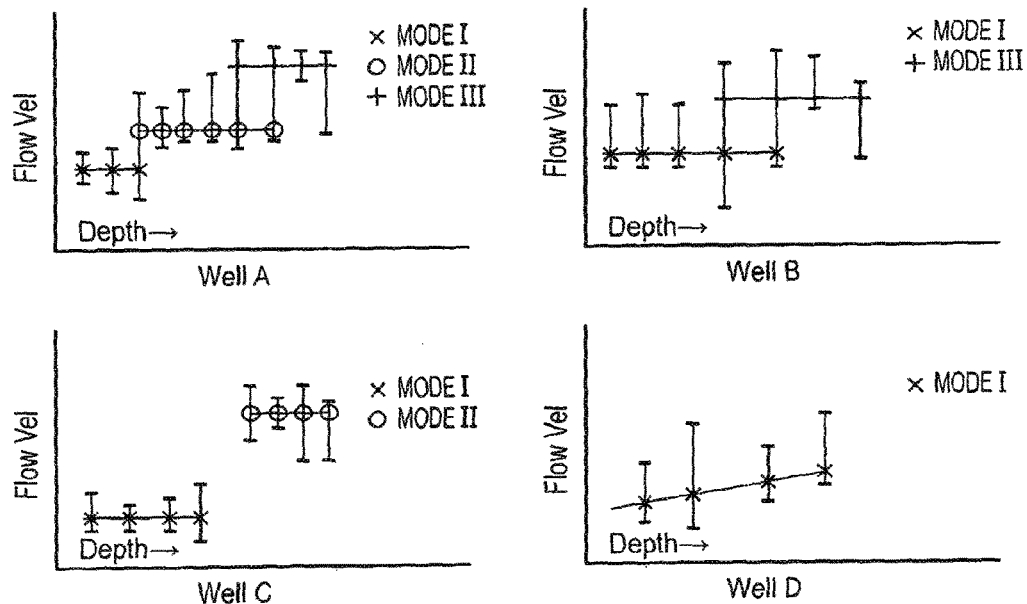
FIG. 9 illustrates the flow as a function of depth of the wells to which FIG. 7 relates, as calculated from the speeds of sound detected and the different modes detected.

As before, these measurements confirm the assertions above that changes in pipe diameter result in changes in modal behaviour which can be observed to glean more information about the behaviour of fluid flow on the region of the pipe diameter change. Of course, modal behaviour may be observed in other situations. It will also be appreciated that changes in the formation will also affect the modes and as such these can be employed to monitor the formation as well as in-well conditions. For example, FIG. 9 illustrates the flow as a function of depth as calculated from the speeds of sound detected and the different modes detected. From this information, it is possible to determine the speed of sound and other parameters relating to the annular fluid volume as well as the inner fluid volume.

As can be appreciated, analysis of the various modes found within the acoustic measurements performed with an iDAS (or equivalent) apparatus provides a sensitive and high resolution method for studying or monitoring well integrity. For example, in addition to tracking eddies, observing events such as outgassing or the presence of solids such as sand or other particulate material, it is possible to make a determination of the hardness of the formation itself.

The invention relates to the use of distributed optical fibre sensors for distributed acoustic sensing, and in particular, modal analysis of distributed acoustic data obtained in-well to monitoring well integrity. By determining one or more acoustic modes corresponding to distributed speed of sound measurements within the wellbore, and analysing variations in the distributed speed of sound measurement it is possible to derive information relating to a formation and/or fluid in the wellbore.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A system, comprising:
a distributed optical fiber sensor having:
   a) a sensing optical fiber deployed along a pipe or flowline, the pipe or flowline having a plurality of respective acoustic propagation regions respectively corresponding to an interior of the pipe or flowline and a wall of the pipe or flowline;
   b) a light source arranged to send optical pulses along the sensing optical fiber; and
   c) means for processing light reflected and/or backscattered from the optical pulses as the optical pulses travel along the optical sensing fiber to measure acoustic signals incident along the length of the sensing optical fiber in order to provide distributed acoustic measurements from along the length of the sensing fiber;

the system further comprising a processor arranged to:
   i) process the distributed acoustic measurements from along the length of the sensing fiber to obtain a plurality of distributed speed of sound measurements along the length of the sensing fiber respectively relating to the plurality of respective acoustic propagation regions; and
   ii) analyse variations in the plurality of distributed speed of sound measurements and determining respective acoustic modes corresponding to the plurality of respective acoustic propagation regions in dependence thereon to thereby derive information relating to any of fluid in the pipe or flowline, and/or the condition of the pipe or flowline in dependence on the determined respective acoustic modes, wherein the analysis comprises inverting a pipe or flowline model against the plurality of distributed speed of sound measurements in order to determine a value of one or more unknown parameters in the pipe or flowline model.

2. The system according to claim 1, wherein the plurality of respective acoustic propagation regions respectively corresponds to three or more of: the interior of the pipe or flowline; the wall of the pipe or flowline, and/or a casing surrounding the pipe or flowline.

3. The system according to claim 1, wherein the analysis comprises determining an acoustic amplitude corresponding to the, each, or a distributed speed of sound measurement.

4. The system according to claim 1, wherein the analysis comprises determining relative amplitudes corresponding to different acoustic modes.

5. The system according to claim 1, wherein the analysis comprises determining dispersion characteristics of the, each, or an acoustic mode.

6. The system according to claim 1, wherein the analysis comprises determining an upper-frequency cut-off for the presence of modal phenomena.

7. The system according to claim 1, wherein the pipe or flowline model is configured to receive as an input one or more speed of sound measurements and output one or more corresponding pipe or flowline parameters.

8. The system according to claim 1, wherein the pipe or flowline model is configured to treat speed of sound as a known parameter and other model parameters as unknowns.

9. The system according to claim 1, wherein the analysis comprises identifying one or more features in the, each, or a distributed speed of sound measurement and attributing the one or more features to one or more corresponding events.

10. The system according to claim 9, wherein identifying one or more features comprises determining the presence and/or location of one or more discontinuities; variations; and/or relative variations between modes, in relation to speed of sound and/or amplitude corresponding to an acoustic signal.

11. The system according to claim 1, wherein the analysis comprises averaging the, each, or a distributed speed of sound measurement along at least a portion of the pipe or flowline.

12. The system according to claim 1, wherein the processor is further arranged to derive information relating to fluid flow within the pipe or flowline.

13. The system according to claim 1, the processor being further arranged to track eddies, detect outgassing events, and/or detect the presence and position of solids or particulate material in the wellbore.

14. The system according to claim 13, wherein the tracking and/or detecting are performed in real-time.

15. The system according to claim 1, wherein the wellbore model is based on full 3-D elastodynamic equations and parameters of the well.

16. The system according to claim 1, wherein the means for processing light reflected and/or backscattered from the optical pulses comprises an interferometer.

17. A system for monitoring a pipe or flowline, the system comprising:
   a distributed optical fiber sensor having:
      a) a sensing optical fiber deployed along the pipe or flowline, the pipe or flowline having a plurality of respective acoustic propagation regions respectively corresponding to an interior of the pipe or flowline and a wail of the pipe or flowline
      b) a light source arranged to send optical pulses along the sensing optical fiber; and
      c) means for processing light reflected and/or backscattered from the optical pulses as the optical pulses travel along the optical sensing fiber to measure acoustic signals incident along the length of the sensing optical fiber in order to provide distributed acoustic measurements from along the length of the sensing fiber;
   the system further comprising a processor arranged to:
      i) process the distributed acoustic measurements from along the length of the sensing fiber to obtain a plurality of distributed speed of sound measurements along the length of the sensing fiber respectively relating to the plurality of respective acoustic propagation regions; and
      ii) analyse variations in the plurality of distributed speed of sound measurements and determining respective acoustic modes corresponding to the plurality of respective acoustic propagation regions in dependence thereon to thereby derive information relating to any of, fluid in the pipe or flowline, and/or the condition of the pipe or flowline in dependence on the determined respective acoustic modes;
   wherein the analysis comprises identifying one or more features in the plurality of distributed speed of sound measurements and attributing the one or more features to one or more corresponding events, wherein identifying the one or more features comprises determining the presence and/or location of one or more discontinuities, variations, and/or relative variations between acoustic modes, in relation to speed of sound and/or amplitude corresponding to an acoustic signal.

18. A system, comprising:
   a distributed optical fiber sensor having:
      a) a sensing optical fiber deployed along a pipe or flowline, the pipe or flowline having a plurality of respective acoustic propagation regions respectively corresponding to an interior of the pipe or flowline and a wall of the pipe or flowline;
      b) a light source arranged to send optical pulses along the sensing optical fiber; and
      c) means for measuring acoustic signals incident along the length of the sensing optical fiber, via light reflected and/or backscattered from the optical pulses as the optical pulses travel along the optical sensing fiber, to provide distributed acoustic measurements from along the length of the sensing fiber;
   the system further comprising a processor arranged to:
      i) process the distributed acoustic measurements from along the length of the sensing fiber to obtain a plurality of distributed speed of sound measurements along the length of the sensing fiber respectively relating to the plurality of respective acoustic propagation regions; and
      ii) analyse variations in the plurality of distributed speed of sound measurements and determining respective acoustic modes corresponding to the plurality of respective acoustic propagation regions in dependence thereon to thereby derive information relating to any of fluid in the pipe or flowline, and/or the condition of the pipe or flowline in dependence on the determined respective acoustic modes, wherein the analysis comprises inverting a pipe or flowline model against the plurality of distributed speed of sound measurements in order to determine a value of one or more unknown parameters in the pipe or flowline model.

* * * * *